Figures 4, 5:
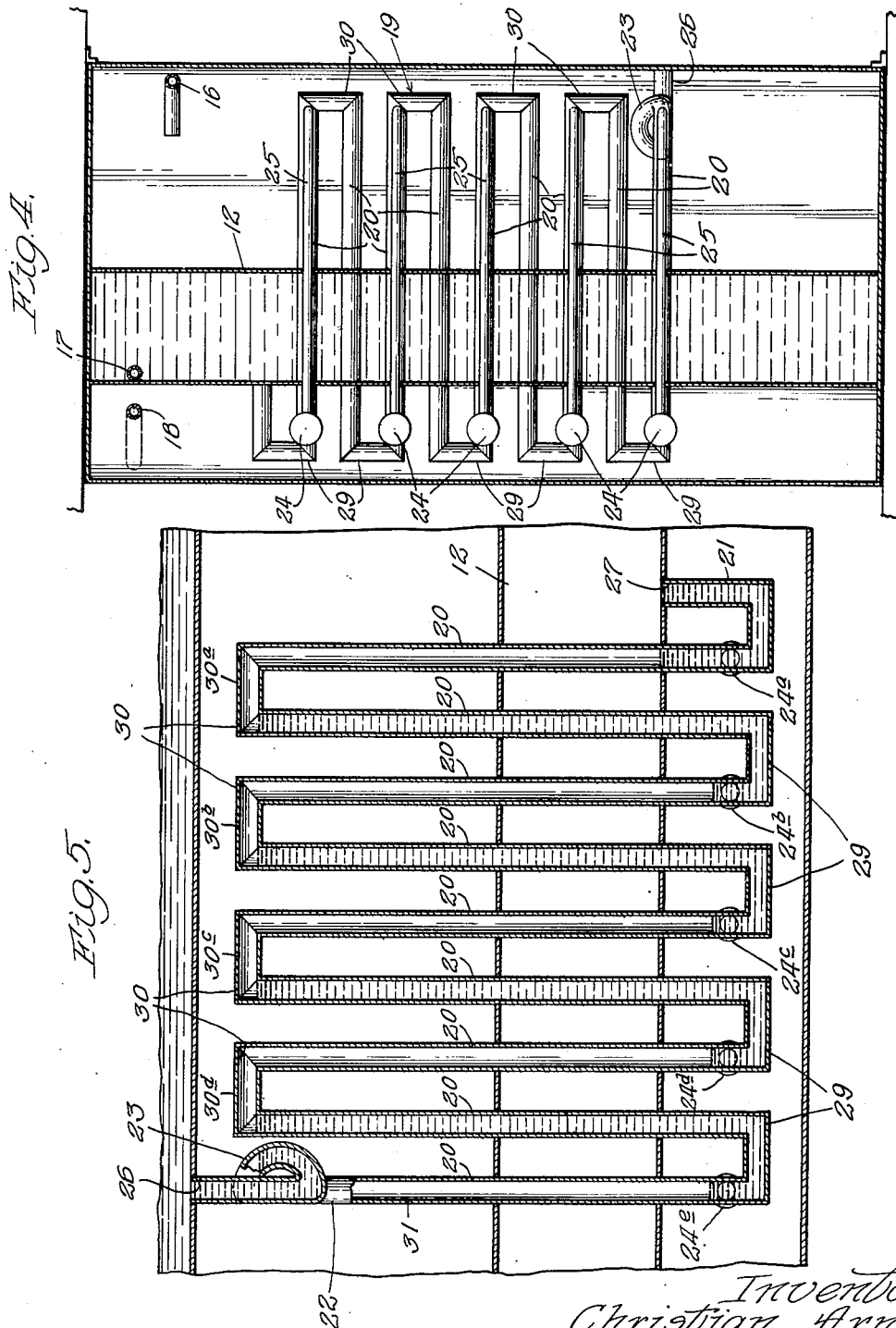

Nov. 11, 1952  C. ARNE  2,617,262
COMPOUND SIPHON
Filed July 11, 1945  4 Sheets-Sheet 1
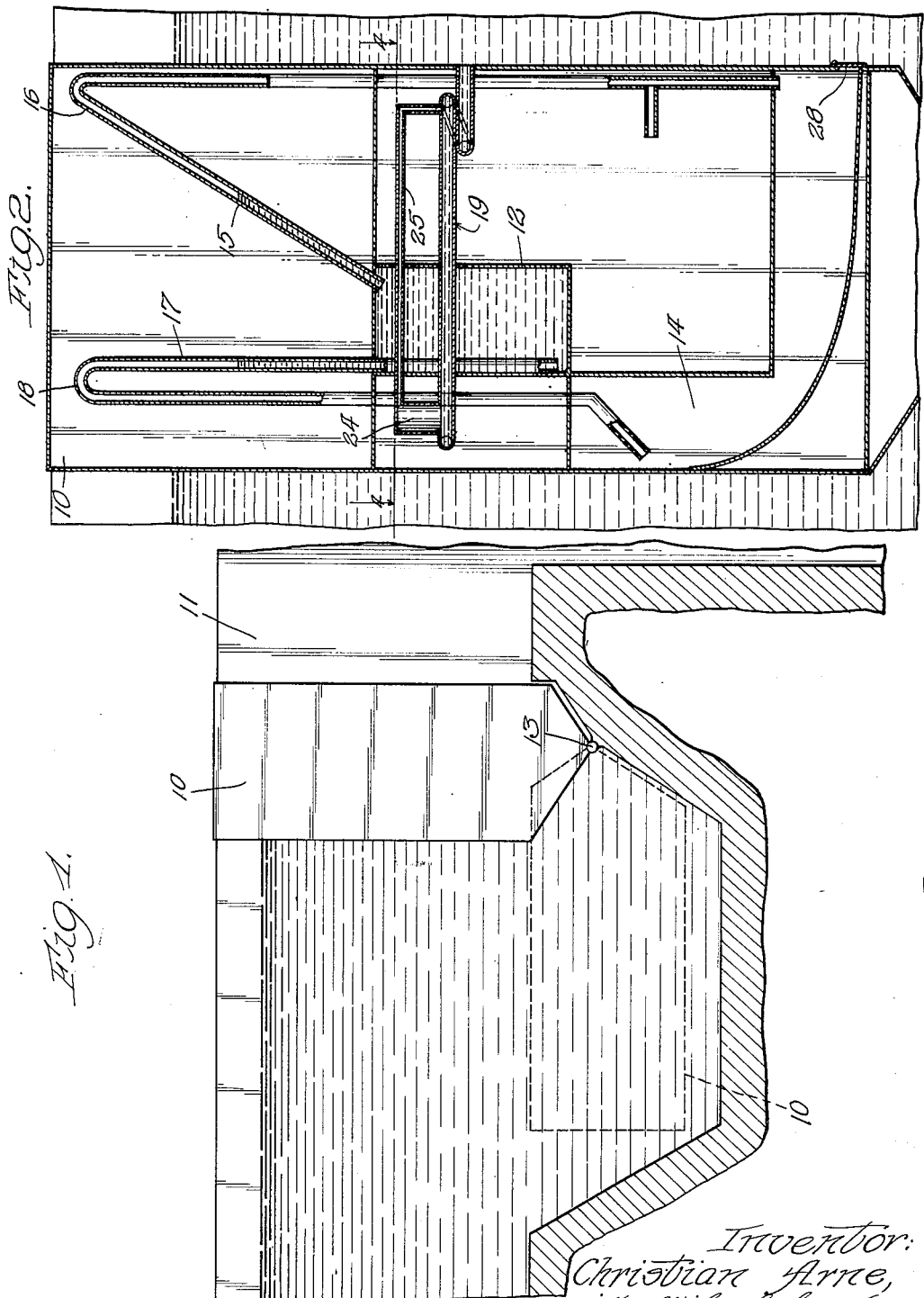
Inventor:
Christian Arne,
By Britton, Wiles, Schroeder
Merriam & Hoffgren, Attys.

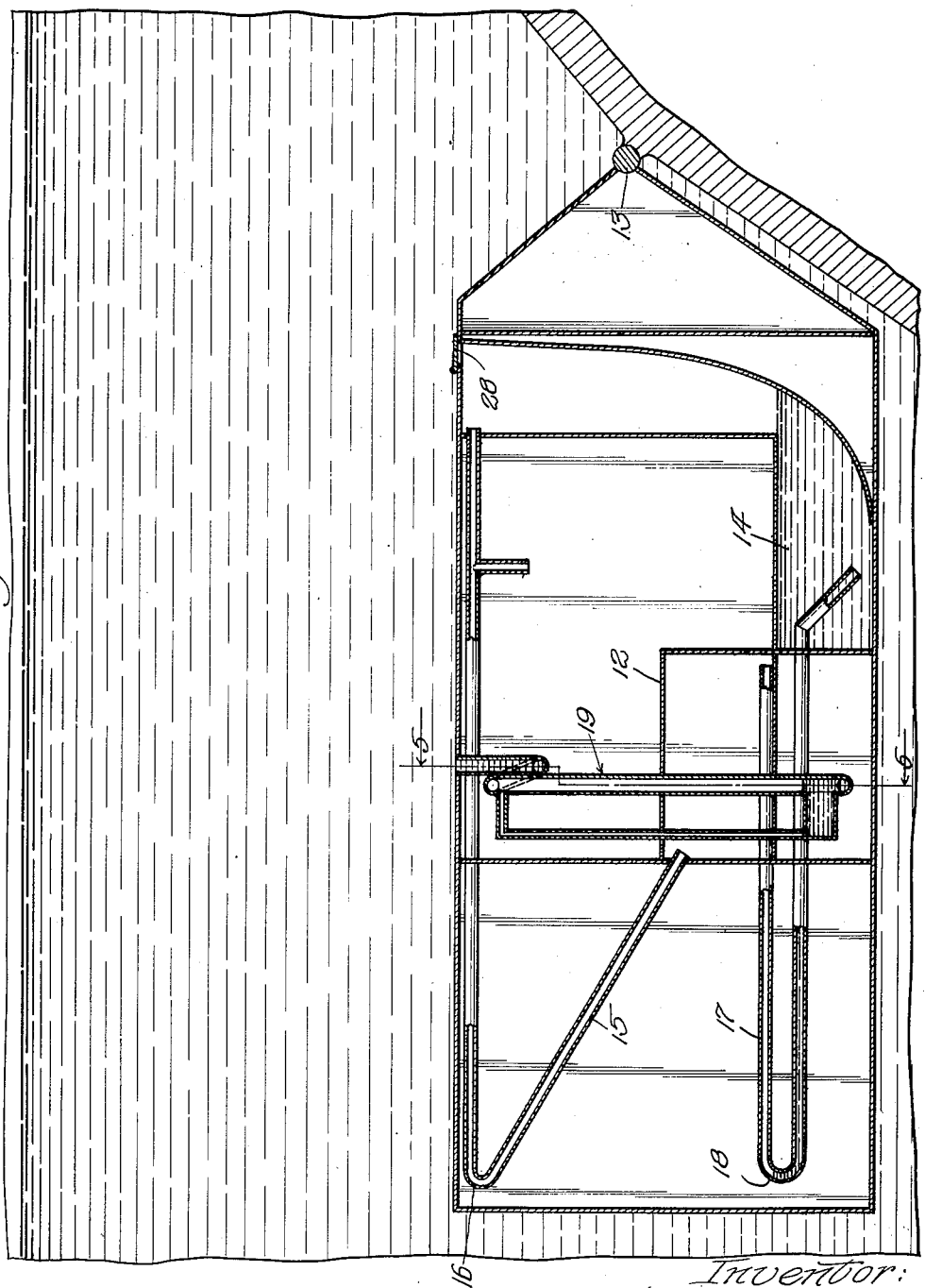

Nov. 11, 1952 — C. ARNE — 2,617,262
COMPOUND SIPHON
Filed July 11, 1945 — 4 Sheets-Sheet 3

Inventor:
Christian Arne,
By Christen, Wiles, Schroeder,
Merriam, & Hofgren, Attys.

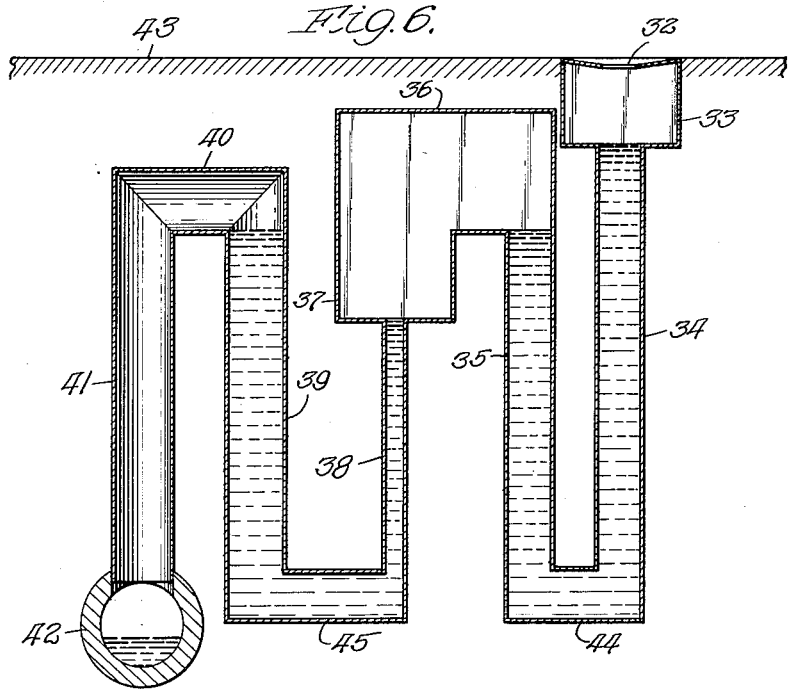
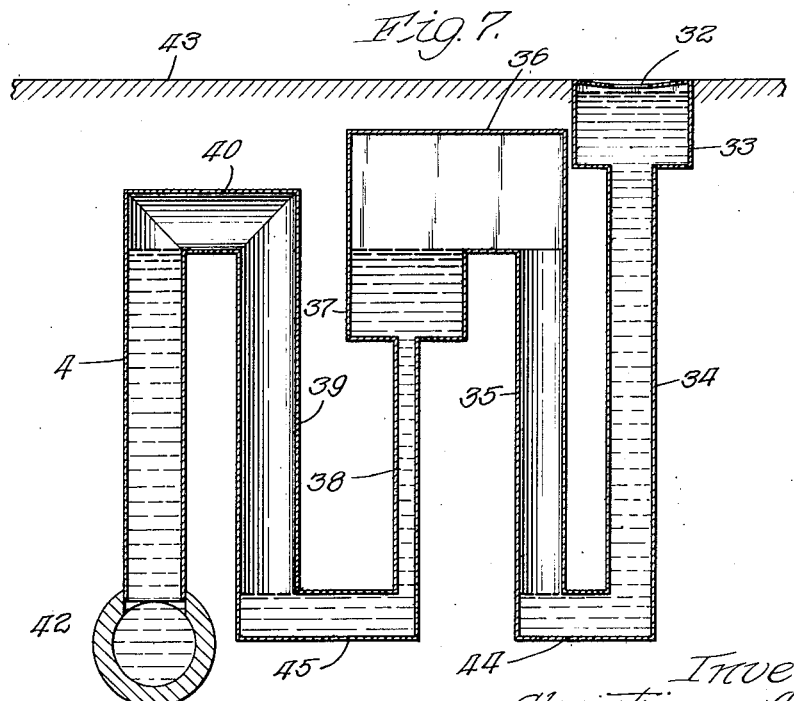

Patented Nov. 11, 1952

2,617,262

UNITED STATES PATENT OFFICE 2,617,262

COMPOUND SIPHON

Christian Arne, Chicago, Ill.

Application July 11, 1945, Serial No. 604,455

11 Claims. (Cl. 61—22)

This invention relates to liquid flow control means.

The liquid flow control means which is the subject of this invention comprises a series of passageways such as tubes angularly arranged at less than 180° with respect to each other, and with at least some of the tubes normally arranged at an angle to the horizontal. These tubes have alternate ends connected to make one long tube, open at both ends, with one of the ends at a higher pressure level than the other. This higher end is normally in communication with a source of liquid. The upper connections of the tubes are provided with a source of confined air to be entrapped within the tubes when liquid flows through them. Each pocket of entrapped air is out of communication with any other pocket.

These flow controls have many uses, as they can serve as automatic valves to permit flow of water or other liquid in one direction, but will resist flow in the opposite direction, due to the sum of the hydrostatic heads in the several tubes. The automatic flow control may also be used as a valve to permit ready flow of liquid when the control is in one position, but to prevent flow when the control is turned to a different position. When used as a valve to permit flow of water in one direction but to resist flow in an opposite direction, the flow control means can be used to prevent drains from backing up. It can also be used as a flood control device to permit water to drain off of fields through an opening in a levee or permanent dam when the water in the stream is at normal height, and to prevent water from backing up through the opening when the stream is in flood.

These liquid flow control means have many varied uses as automatic valves. They are very simple in construction, as they consist primarily of a series of singularly arranged tubes, and have no moving mechanical parts.

The flow control is particularly useful in an automatic lock gate such as is disclosed in my U. S. Patent 2,375,739, issued May 8, 1945.

The invention will be described as related to typical embodiments of the same, as set out in the accompanying drawings. Of the drawings, Fig. 1 is an elevation of an automatic lock gate on the upstream side of a lock basin; Fig. 2 is a cross section of the gate in vertical position taken through the center of the gate and partially broken away for clarity of illustration; Fig. 3 is an elevation similar to Fig. 2, but showing the gate in horizontal position; Fig. 4 is a section taken along line 4—4 of Fig. 2; Fig. 5 is a section taken along line 5—5 of Fig. 3; Fig. 6 is a sectional elevation of a liquid flow control used as a sewer drain and filled with water from the inlet opening; and Fig. 7 is a view similar to Fig. 6, but showing the flow control filled with back overflow water from the sewer.

In the embodiment shown in Figs. 1 to 5, inclusive, of the drawings the liquid flow control means is used as an automatic valve to replace the float valve shown in my Patent No. 2,375,739. For illustrative purposes, the lock gate on the upstream side of the lock basin is shown in Fig. 1. The gate 10 is in vertical position with the lock basin 11 substantially empty of water. The lock gate 10 is shown in horizontal position by dotted lines.

Within the automatic lock gate 10 there is a water tank 12 located a relatively great distance from the fulcrum point 13 of the gate, a second water tank 14 located closer to the fulcrum, an air pipe 15 extending from the water tank 12 to the lower portion of the gate and having a bend 16 above the high water level, a water pipe 17 extending from the first water tank 12 to the second water tank 14 and having a bend 18 also above the high water level, and a flow control 19 connecting the lock basin 11 to the first water tank 12.

The flow control comprises a series of substantially horizontal parallel pipes 20 connected at alternate ends to make one continuous pipe. One end 21 of the pipe empties into the first water tank 12, while the other end 22 of the pipe is connected through a loop 23 to the lock basin. The loop serves as a water trap to prevent the escape of air from the pipes when the lock gate is in horizontal position. The control also includes air tanks 24 located at the bottom of alternate pipes 20 and in communication therewith. From the air tanks 24 air pipes 25 extend to the top of the pipes. The flow control is arranged so that the water intake opening 26 is above the water outlet opening 27 leading to the water tank 12 when the lock gate is in horizontal position as shown in Fig. 3.

When the automatic lock gate is in vertical position (Fig. 2) the pipes 20 function only as water pipes to permit flow of water from the lock basin into the water tank 12. When the water tank is filled with water the water will rise in air tube 15 and water tube 17 until it reaches the level of the water outside minus the air pressure within the lock gate. As soon as the water tank 12 is completely filled the weight of the water within the tank will cause the gate to move about its fulcrum 13 and into a horizontal position (Fig. 3). The water then flows into the pipe 17 and into the second water tank 14. Because the moment of water tank 14 about fulcrum 13 is less than the moment of water tank 12 about the fulcrum the gate will then become buoyant and begin to rise. The water in tank 14 then flows out valve 28 into the lock basin. The lock gate then rises to its vertical position.

When the lock gate 10 is in horizontal position the pipes 20 function to prevent any further flow of water through the water intake opening 26. When the lock gate has reached its horizontal position the water flows to the bottom loops 29 and fills the air tanks 24, forcing the air through pipes 25 into the top loops 30. As the water empties out of first water tank 12 into the second water tank 14 the air and water within the parallel pipes 20 reach a stage of equilibrium. After equilibrium has been reached, as illustrated in Fig. 5, the first, third, fifth, seventh, and ninth pipes 20 from the outlet end 27 are filled with air, while the other pipes are filled with water. This sets up a pressure at the intake opening 26, which prevents further flow of water into the system. This resistant pressure is caused by the sum of the hydrostatic heads within the several pipes. Thus it can be seen that when the automatic lock gate is in vertical position the control means operates only as a water intake to permit substantially unrestricted flow of water into the water tank 12. When the lock gate is in horizontal position, however, the control means serves its intended purpose and prevents further flow of water into tank 12.

The dimensions of the various parts of the control are dependent upon the environment in which it is to be used. Thus if the depth to which the lock gate is submerged is great, then there must be a greater resistance provided at the water intake 26, so that no water will flow into the gate when it is in submerged position. This resistance pressure is dependent upon the dimensions of the system. In a typical example the parallel pipes are 8 ft. long, and the depths from the top of the air chamber 24 (Fig. 5) to the top of the pipes is 7 ft. These pipes are 4 in. in diameter, and there are nine of them in parallel arrangement. The first top loop 30a has an air pressure that is at normal atmospheric pressure plus the air pressure within the gate, for example 2 feet. The second loop 30b is filled with air at a pressure of 9 ft. of water. The air in the third loop 30c is at a pressure of 16 ft. of water, and the air in the 4th loop 30d, is at a pressure of 23 ft. of water. The air within the length of pipe 31 connected to the water inlet 26 is at 30 ft. of water. The distance from the top of the water level in loop 23 to the inlet opening 26 will be, for example, one foot. This will produce a resistance head at opening 26 of 30 minus one or 29 feet of water. Thus when the lock gate is under 29 ft. of water there will be no flow of water into the gate through inlet opening 26. If the depth of water is less than this, the flow of water will also be prevented, but a new condition of equilibrium will have been set up within the gate.

The sizes of the air tanks 24 are determined by the volume of air trapped in pipes 20 and the pressure of air under equilibrium conditions in each corresponding pipe. Thus when the gate is to be submerged under not more than 29 feet of water and the dimensions of the syphon are as given above, the volumes of the air tanks are as follows: tank 24a (nearest the outlet 27 into water tank 12) is 1285 in.³, tank 24b is 1520 in.³, tank 24c is 1770 in.³, 24d is 2020 in.³, and 24e is 2260 in³. The air pipes 25 are made very small in internal diameter relative to the pipes 20.

A flow control used as a part of a sewer drain is illustrated in Figs. 6 and 7. Here the control permits flow of water into the sewer, but resists any backing up of the sewer. Thus the flow of water is permitted when it proceeds in one direction, but water is prevented from flowing in the opposite direction. This embodiment comprises a drain opening 32 located in the floor 43 and connecting directly to an enlarged pipe 33. At the bottom of this pipe is located a first water pipe 34 connected to a second water pipe 35. This second water pipe is attached at its top end to an enlarged pipe 36 which is in communication with a second enlarged pipe 37 and third water pipe 38. The last water pipe is connected at the bottom to a fourth water pipe 39 having a connecting pipe 40 at the top thereof communicating with fifth water pipe 41. This fifth water pipe empties into the sewer 42. When the control is used as an ordinary drain, water pipes 34, 35, 38, and 39 fill with water and provide a sewer trap to prevent gases from the sewer pipe 42 escaping through the drain opening 32. The water level in pipe 34 is greater than that in pipe 35, and the water level in pipe 39 is greater than that in pipe 38, due to the pressure of entrapped air within the system. When the sewer tends to back up, water pipe 41 and enlarged pipes 33 and 37 fill with water. Pipes 35 and 39 that were formerly filled with water are now filled with air under pressure from the entrapped air within the system. Because this entrapped air is under pressure, flow of liquid from the sewer is resisted by the sum of the hydrostatic heads within the various pipes. This sum will depend upon the dimensions of the various parts of the control. In one embodiment the enlarged pipe 33 is 8" in diameter and 6" long. Pipe 34 is 3" in diameter and 2½ ft. long. Pipe 35 is 3" in diameter and 2 ft. long. The second enlarged pipe 36 is 12" in diameter and 16" long. The third enlarged pipe 37 is 8" in diameter and 6" long. The third water pipe 38 is 1.5" in diameter and 18" long. The fourth water pipe 39 is 4" in diameter and 2 ft. long, while the fifth water pipe 41 is 4.5" in diameter and 2 ft. long. The first connecting pipe 44 between pipes 34 and 35 is 3" in diameter and 9" long. The second connecting pipe 45 is 3" in diameter and 13" long, while the third connecting pipe 40 is 4" in diameter and 12" long. With these dimensions the control when completely filled with back water will have the levels shown in Fig. 7. In this arrangement the further backing up of water will be resisted with a pressure equal to 7 ft. of water.

The flow control means described and claimed herein may be made of lengths of pipe connected together or it may be made of other types of intercommunicating passageways. For example, a tank could be used having partitions separating the tank into several passageways communicating with each other at alternate ends to make one long passageway.

Having described my invention together with typical embodiments of the same, it is my intention that the invention be not limited by the details of description unless otherwise indicated, but rather be construed broadly within its spirit and scope as set out in the accompanying claims.

I claim:

1. Liquid flow control means for permitting liquid flow from an inlet to an outlet and for preventing back flow from the outlet to the inlet comprising a series of elongated tubes each extending upwardly and being capable of containing liquid to form a hydrostatic head therein, said tubes having alternate ends connected to make one continuous tube open at both ends with one end being connected to the inlet and with the other end being connected to the outlet and being located at a lower elevation than the inlet end, said continuous tube conducting liquid from the inlet to the outlet, a source of confined air, and means connecting the lower and upper connections of the tubes with the source of confined air.

2. Flow control means as set out in claim 1 wherein the tubes are substantially parallel to each other.

3. Flow control means as set out in claim 1 wherein the tubes are arranged substantially vertically.

4. Flow control means as set out in claim 1 wherein the tubes are substantially parallel to each other and are arranged substantially vertically.

5. In an automatic lock gate or the like having a dam portion rotatable between vertical and horizontal position, water flow control means comprising a series of elongated pipes in said dam extending in the same general direction, the pipes being connected to each other at alternate ends to form a single continuous pipe communicating at one end to the control basin of the lock and at the other end to a water container within the dam, said container being positioned on one side of a plane passing through the center of gravity and the axis about which the dam rotates, alternate pipes being attached at each of their ends to a source of enclosed air so that air is entrapped within the pipes when the dam is in a horizontal position and each pocket of entrapped air is out of communication with any other pocket, said pipes being constructed and arranged so that there is a substantially free flow of water from the control basin to the container within the dam when the dam is in vertical position to urge the dam to rotate in a horizontal position but flow is prevented by the sum of hydrostatic heads of water within the pipes when the dam is in a horizontal position, buoyant means within the dam, and means for draining water from the container when the dam is in horizontal position to permit the buoyant means to urge the dam to rotate to a vertical position.

6. Flow control means as set out in claim 5 wherein the pipes are substantially parallel to each other.

7. Flow control means as set out in claim 5 wherein the pipes are in a substantially horizontal plane when the gate is in a vertical position.

8. Flow control means as set out in claim 5 wherein there is provided a water trap near the end of the pipe in communication with the control basin.

9. Flow control means as set out in claim 5 wherein the pipes are substantially parallel to each other and in a substantially horizontal plane when the gate is in vertical position.

10. Flow control means as set out in claim 5 wherein the pipes are substantially parallel to each other and in a substantially horizontal plane when the gate is in vertical position, and a water trap is provided near the end of the pipe in communication with the control basin.

11. In an automatic lock gate or the like having a dam portion rotatable between vertical and horizontal positions, said dam having an upstream and control basin face spaced apart, water flow control means comprising a series of elongated pipes in said dam extending in a direction generally between the upstream and control basin faces of the dam, alternate ends of said pipes being connected to form a single continuous pipe communicating at one end with the control basin of the lock and at the other end to a water container within the dam, said container being positioned within the dam to one side of a plane passing through the center of gravity of the dam and the axis about which the dam rotates, alternate pipes of said series being attached at each of its ends to a source of confined air independent of the source of confined air for the other pipes so that air is entrapped within the pipes when the dam is in horizontal position, said pipes being constructed and arranged to provide substantially free flow of water from the control basin to the container within the dam when the dam is in vertical position and at the same time to prevent flow by the sum of hydrostatic heads of water within the pipes when the dam is in horizontal position, buoyant means within the dam and means for draining water from the container when the dam is in horizontal position to permit the buoyant means to urge the dam back to a vertical position.

CHRISTIAN ARNE.

REFERENCES CITED

The following references are of record in the file of this patent:

UNITED STATES PATENTS

| Number | Name | Date |
| --- | --- | --- |
| 746,488 | Fraley | Dec. 8, 1903 |
| 2,012,495 | Bradbeer | Aug. 27, 1935 |
| 2,306,445 | Jewell | Dec. 29, 1942 |
| 2,375,739 | Arne | May 8, 1945 |

FOREIGN PATENTS

| Number | Country | Date |
| --- | --- | --- |
| 4,255 | Great Britain | 1887 |